United States Patent
Callen et al.

(10) Patent No.: US 7,952,806 B2
(45) Date of Patent: May 31, 2011

(54) MULTICOLOR DIODE-LASER MODULE

(75) Inventors: Daniel Warren Callen, Applegate, CA (US); R. Russel Austin, Cool, CA (US)

(73) Assignee: Coherent, Inc., Santa Clara, CA (US)

( * ) Notice: Subject to any disclaimer, the term of this patent is extended or adjusted under 35 U.S.C. 154(b) by 305 days.

(21) Appl. No.: 12/131,349

(22) Filed: Jun. 2, 2008

(65) Prior Publication Data

US 2009/0296242 A1   Dec. 3, 2009

(51) Int. Cl.
*G02B 27/10* (2006.01)
(52) U.S. Cl. .......................................... 359/618; 372/20
(58) Field of Classification Search .................. 359/618; 372/20, 23, 92, 99
See application file for complete search history.

(56) References Cited

U.S. PATENT DOCUMENTS

| | | | | |
|---|---|---|---|---|
| 3,170,983 | A * | 2/1965 | Riedel | 359/374 |
| 5,140,466 | A * | 8/1992 | Parker | 359/633 |
| 5,276,694 | A * | 1/1994 | Wolf et al. | 372/20 |
| 6,648,475 | B1 * | 11/2003 | Roddy et al. | 353/31 |
| 7,001,022 | B2 * | 2/2006 | Kim et al. | 353/31 |
| 7,129,505 | B2 | 10/2006 | Oostman, Jr. et al. | 250/458.1 |
| 7,748,853 | B2 * | 7/2010 | Yamauchi | 353/97 |

* cited by examiner

*Primary Examiner* — Timothy J Thompson
(74) *Attorney, Agent, or Firm* — Morrison & Foerster LLP

(57) ABSTRACT

A multi-laser module includes two compartments arranged one above the other. The lower compartment includes four lasers and four corresponding beam-steering mirrors arranged to direct corresponding laser beams into the upper compartment. The upper compartment includes a regular pentagonal prism and four other beam-steering mirrors each arranged to receive one of the laser beams and direct that beam to the prism. The beam prism has three dichroic-coated surfaces and two antireflection-coated surfaces. Each of three of the beams enter the prism via a corresponding one of the dichroic-coated surfaces. The fourth beam enters the prism via one of the antireflection coated surfaces, and all of the beams exit the prism via the other antireflection coated surface along a common path.

18 Claims, 4 Drawing Sheets

MULTICOLOR DIODE-LASER MODULE

TECHNICAL FIELD OF THE INVENTION

The present invention relates in general to methods and apparatus for optical beam combining. The invention relates in particular to methods of combining four or more laser beams each thereof having a different wavelength from any other.

DISCUSSION OF BACKGROUND ART

There are certain applications of laser radiation that require a beam of radiation including a plurality of discrete wavelengths or colors. Such applications include flow cytometry, genomics, and confocal microscopy. As commercial lasers typically emit radiation at nominally only one wavelength, such a multicolor beam is typically provided by combining the beams of a plurality of lasers using an optical system including a plurality of dichroic-filter-coated beam combiners. The "footprint" of such a system scales with the number of colors, and hence the number of lasers required in the output beam. As the dichroic-combiners form part of a beam alignment chain, each preferably has two accurately polished surfaces, with a dichroic coating on one surface and an antireflection coating on the other. This adds significant cost to a system as more lasers are added. A reduction in the size or cost of a multicolor laser system could expand the range of applications for such a system.

SUMMARY OF THE INVENTION

In one aspect optical apparatus in accordance with the present invention comprises a housing including first second and second compartments arranged one above the other. The first compartment includes a plurality N of lasers, each thereof each thereof arranged to emit one of a corresponding plurality of laser beams each thereof one of N different wavelengths, and N first beam-steering mirrors arranged to direct the corresponding one of the laser beams into the second compartment. The second compartment includes a beam combining arrangement and N second beam-steering mirrors. Each of the second beam-steering mirrors is arranged to receive the beam from a corresponding one of the N first beam-steering mirrors and direct that beam to the beam-combining arrangement. The beam combining arrangement is configured to receive the N beams and combine the beams on a common path.

In another aspect of the present invention, the beam-combining arrangement is a polygonal prism having at least N+1 surfaces. Each of the N beams is received by a corresponding one of N of the N+1 surfaces and the beams exit the prism on the common path via a different one of the at least N+1 surfaces.

In one preferred embodiment of the present invention, four beams, each thereof having a different color are combined by a prism having the form of a regular pentagon, i.e., having five surfaces with adjacent ones thereof inclined to each other at the same angle. First, second, and third ones of the surfaces are coated such that each is transmissive for one of three of the colors the colors and reflective for at least one of the other colors. A fourth of the surfaces is antireflection coated for at least the fourth color. The fifth surface is antireflection coated for all of the colors.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
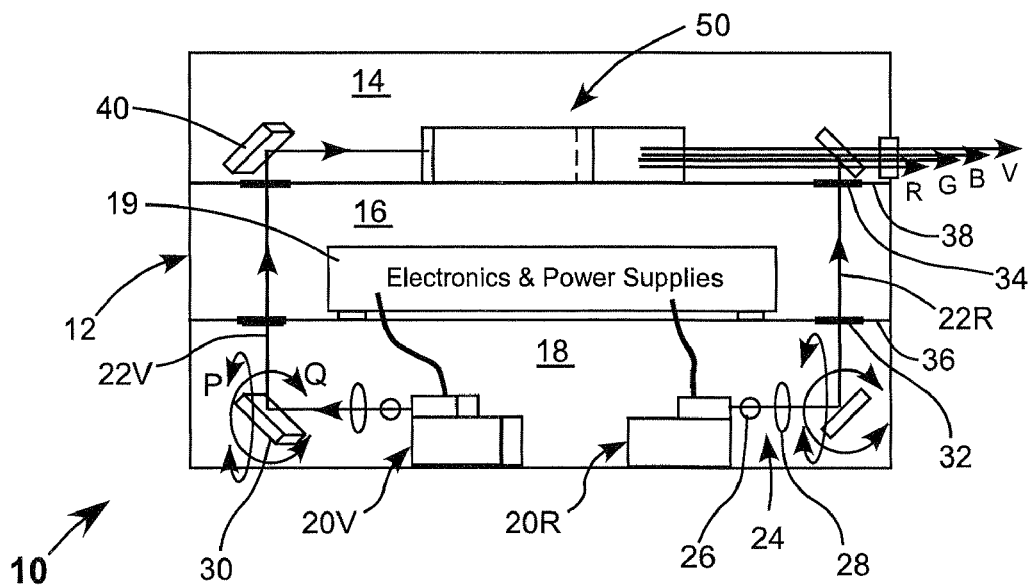
FIG. 1 is side-elevation view partly in cross-section schematically illustrating one preferred embodiment of a multicolor laser module including a housing having three compartments arranged one above the other, a lower one of the compartments including a plurality of lasers and a corresponding plurality of beam steering mirror, and an upper one of the compartments including another corresponding plurality of beam steering mirrors and a beam combining arrangement in the form of a regular pentagonal prism.
Figure 2:
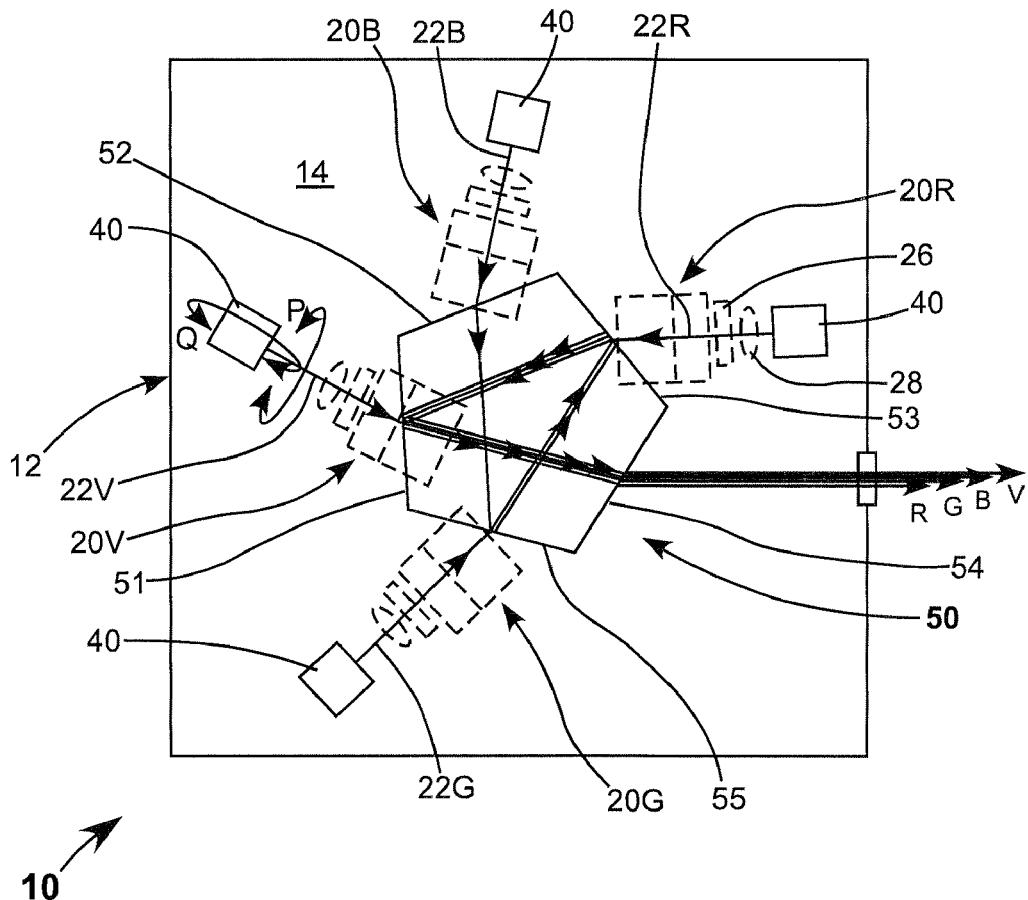
FIG. 2 is a plan view from above, partly in cross-section cross section schematically illustrating detail of the layout of beam-steering mirrors and the beam combining arrangement in the module of FIG. 1.

Referring now to the drawings, wherein like components are designated by like reference numerals, FIG. 1 is a side-elevation view partly in cross-section schematically illustrating one preferred embodiment 10 of a multicolor laser module in accordance with the present invention. Module 10 includes a housing 12. Housing 12 is divided into an upper compartment 14, a central compartment 16 and a lower compartment 18, with the compartments arranged one above the other. FIG. 2 is a plan view from above schematically illustrating detail of the layout of upper compartment 14 of housing 12 with components housed in lower compartment 18 indicated in phantom.

It is assumed that module 10 delivers a beam including four colors, violet (V), blue (B), green (G) and red (R). These colors, however, should not be construed as limiting the present invention to any number or value of wavelengths to be combined in a beam. Lower compartment 18 includes four lasers 20, preferably diode-lasers. The lasers are designated in FIGS. 1 and 2 as lasers 20V, 20B, 20G, and 20R according to the color of radiation emitted. Beams 22 emitted by the lasers are correspondingly designated 22V, 22B, 22G, and 22R. The laser beams are collimated by optics 24, here depicted as cylindrical lenses 26 and 28. Lens 26 is a fast axis collimator and lens 28 is a slow-axis collimator.

Each of the laser beams is incident on a dedicated one of four first beam steering mirrors 30, each thereof rotatable about axes perpendicular to each other as indicted by arrows P and Q. Each laser beam is directed upward by the beam-steering mirror, via apertures 32 and 34 in partitions 36 and 38, respectively, defining the compartments 14, 16, and 18 of housing 12.

In upper compartment 14, each of the beams 22V, 22B, 22G, and 22R is intercepted by a dedicated one of four second beam-steering mirrors 40, each thereof rotatable about axes perpendicular to each other as indicted by arrows P and Q. Beam steering mirrors 40 direct the beams to a beam-combining arrangement 50.

Beam combining arrangement 42, here, is in the form of a regular pentagonal prism having faces (surfaces) 51, 52, 53, 54, and 55. Surfaces 51, 53, and 55 can be defined as beam combining surfaces. These surfaces are optically coated to be maximally transmissive for a particular one of the beams (colors) to be combined and maximally reflective for at least one of the others. Surface 52 is preferably optically coated to be transmissive for at least the color (wavelength) of the beam that enters the prism thereby. Surface 54 is preferably antireflection coated for the wavelengths (colors) of all four beams.

Control electronics and power supplies 19 for the lasers are located in central compartment 16. This allows a greater separation of the lasers from the beam-combining arrangement which in turn provides increased optical leverage for the lower steering mirrors while utilizing intermediate space. Clearly the lasers could be located in the central compartment and the power supplies located in the lower compartment without departing from the spirit and scope of the present invention.

Figure 3:
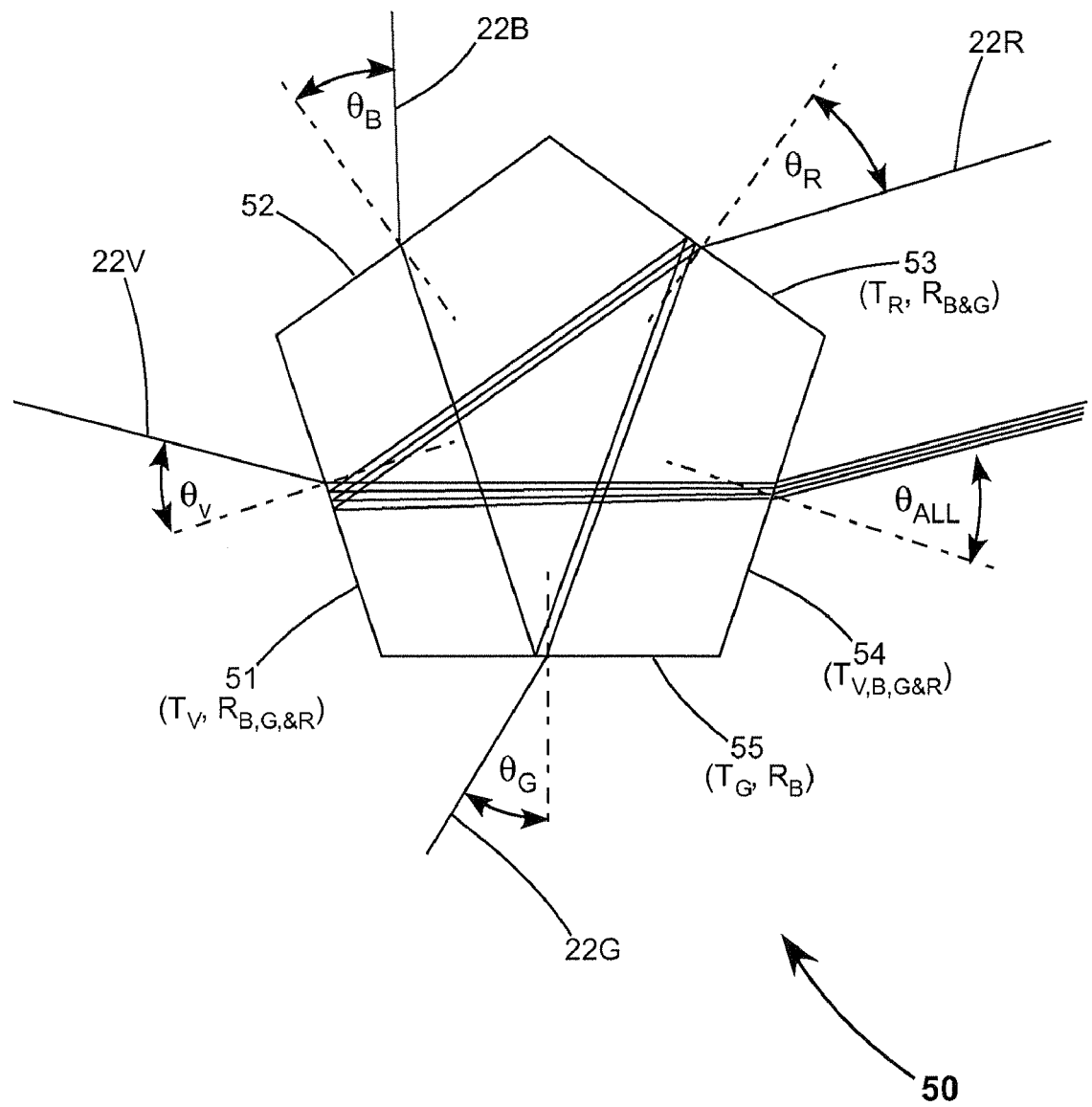
FIG. 3 is a plan view from above schematically illustrating detail of the pentagonal prism of FIGS. 1 and 2 identifying three dichroic coated surfaces of the prism and combination of four different-colored laser beams along a common path by the dichroic-coated surfaces of the prism.

Continuing now with reference to FIG. 2, and with reference in addition to FIG. 3, beam 22V is incident on surface 51, and enters prism 50 via this surface, which is coated to be maximally transmissive for the violet wavelength ($T_V$) and maximally reflective for the blue green and red wavelengths ($R_{B,C,\&R}$). The beam is refracted towards the normal and exits the prism via surface 54 being refracted away from the normal on entry. Beam 22B is incident on surface 52, and enters prism 50 via this surface. The beam is refracted towards the normal, is successively reflected from faces 55 ($T_G$, $R_B$), 53 ($T_G$, $R_{B\&G}$), and 51 ($T_G$, $R_{B,G\&R}$) and exits the prism via surface 54 along the path of beam 22V. Beam 22R is incident on surface 53, and enters prism 50 via this surface. The beam is refracted towards the normal, is reflected from face 55, and exits the prism via surface 54 along the path of beams 22V and 22B. Beam 22G is incident on surface 55, and enters prism 50 via this surface. The beam is refracted towards the normal, is reflected successively from faces 53 and 51, and exits the prism via surface 54 along the path of beams 22V, 22B, and 22R.

It should be noted here that the order in which the beam-colors are combined is arbitrarily selected. Any other order may be selected without departing from the spirit and scope of the present invention. Selection may be made, for example, according to the ease of designing the dichroic coatings.

Regarding the external incidence angles $\theta_V$, $\theta_B$, $\theta_G$, and $\theta_R$ (see FIG. 3), and the position of incidence of the beams to be combined on the respective surfaces of prism 50, the following should be noted. If prism 50 were made from a hypothetical non-dispersive material the internal incidence angle (or refraction angle) would ideally be 18° on all surfaces through which a beam transmitted or from which a beam is reflected. In this case also the external incidence angles would all be the same and determined by the (one value) of refractive index. By way of example, for a material having a non-dispersive refractive index of 1.52, $\theta_V$, $\theta_B$, $\theta_G$, and $\theta_R$ would each be about 28.01° degrees Beams would enter each surface exactly mid-way along the length of that surface.

Practical materials for prism 50 will have a dispersive refractive index. Which means that if all beams are to leave the prism exactly on a common path (at exit angle $\theta_{ALL}$), $\theta_V$, $\theta_B$, $\theta_G$, and $\theta_R$ may have slightly different values, beams may enter the surfaces not exactly mid-way therealong, and may deviate slightly from following common paths within the prism. By way of example, for BK7 glass, the incidence angles that provide an 18° refraction angle are about 0.2° different for violet and red wavelengths (the extremes of wavelength in this case). This would reduce to about 0.1° for fused silica ($SiO_2$).

One way to deal with this dispersive situation in practice, is to select an (external) exit incidence angle $\theta_{ALL}$ close to the ideal (non-dispersive) angle for the material for all of the beams at the midpoint of the exit surface (here surface 54). Then each beam can be traced back through the prism, using the appropriate refractive index for the wavelength of the beam, to determine the required entrance point and incidence angle for the beam at the entrance surface.

Another way to deal with dispersion, particularly for a relatively small prism of a low dispersive material such as fused silica, is to configure beam-direction nominally for an ideal case and then simply reposition and re-align the beams using the beam-steering mirror (upper and lower) pairs. Such an alignment procedure may be necessary, in any event, to accommodate alignment variations throughout the system within manufacturing tolerances.

In each of the above alignment cases, beams will be about on a common path in between surfaces 51 and 54 inasmuch as the beams will deviate by less than about ±0.1 degree of a common path. The beams will be essentially exactly on a common path on exiting the prism at surface 54.

Figure 4:
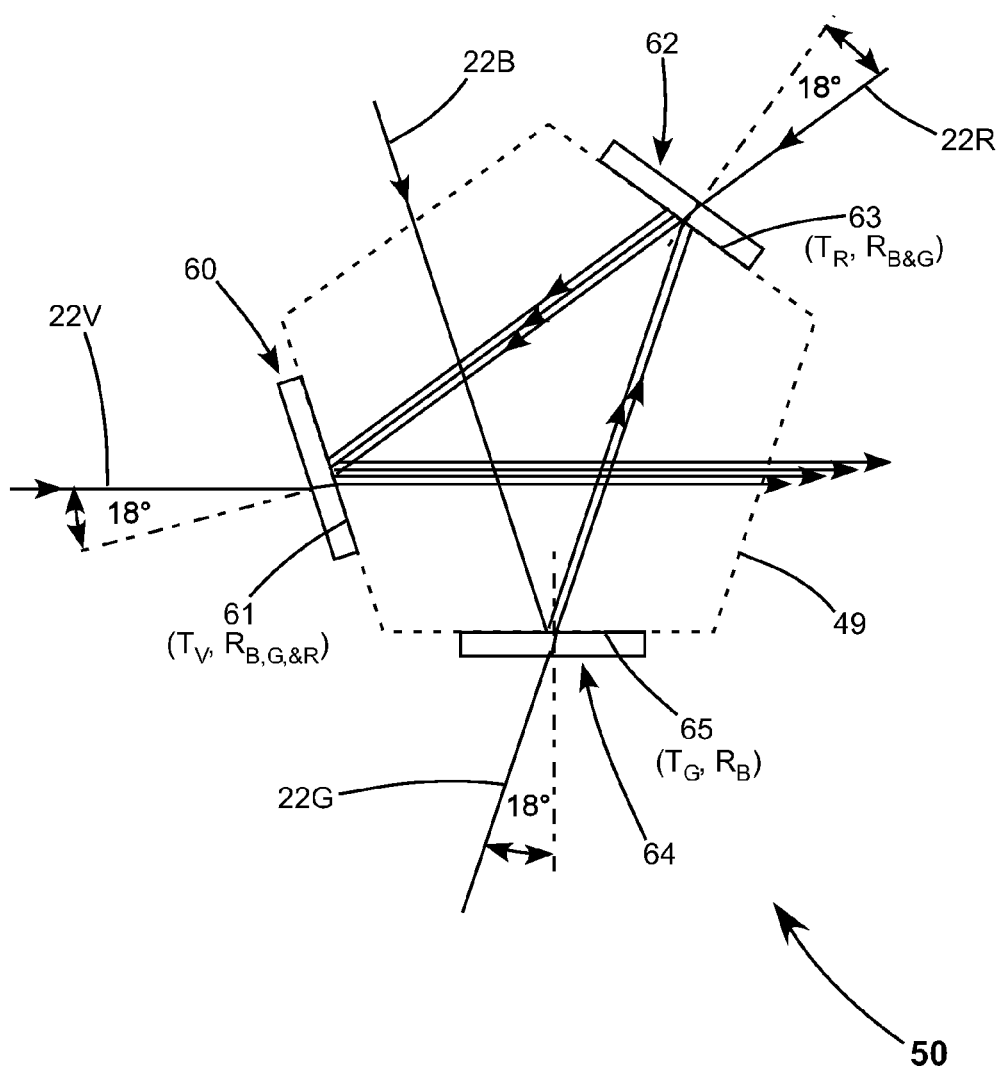
FIG. 4 is a plan view from above schematically illustrating one alternate beam-combining arrangement for the module of FIGS. 1 and 2 including three dichroic mirrors arranged on three sides of an imaginary regular pentagon.

FIG. 4 schematically illustrates one alternative beam combining arrangement 50A suitable for use in the module of FIGS. 1 and 2. Here mirrors 60, 62, and 64, have dichroic-coated surfaces 61, 63, and 65 respectively corresponding to surfaces 51, 53, and 55 of prism 50 of FIG.3. Opposite surfaces are preferably antireflection coated for the wavelength to be transmitted by the dichroic-coated surface. Surfaces 61, 63, and 65 are aligned with sides of an imaginary regular pentagon 49.

Beam-combining arrangement 50A has an advantage over prism 50 in that there need not be any allowance for effects of dispersion in aligning the input beams. Disadvantages, however, are that each mirror must be individually mounted aligned and fixed, and six coated surfaces (three dichroic-coated and three antireflection-coated) are preferred, compared with five coated surfaces of the prism. In prism 50 all surfaces thereof are permanently aligned with each other as part of manufacturing the prism and the prism can be simply installed an aligned in the module. Whether a prism or mirrors are preferred for the beam-combining arrangement, a regular polygonal arrangement of dichroic-coated surfaces therein, combined with the tiered compartmented arrangement with lasers located below (or above) the beam-combining arrangement, provides for a compact assembly of the inventive module including the beam-combining arrangement.

Figure 5:
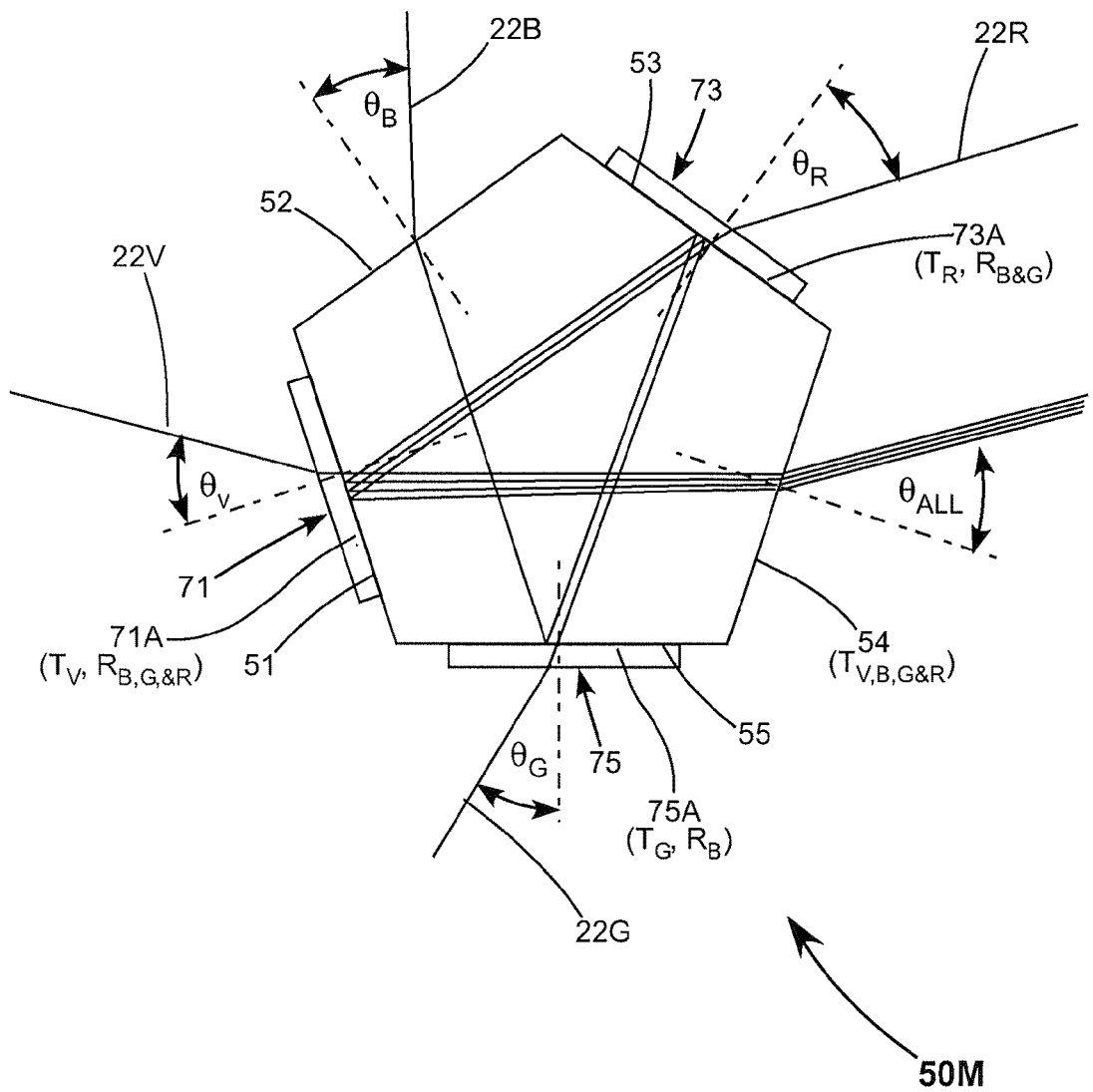
FIG. 5 is a plan view from above schematically illustrating another alternate beam-combining arrangement for the module of FIGS. 1 and 2 including three dichroic coated elements optically bonded dichroic-side down on surfaces sides of regular pentagonal prism.

One potential disadvantage of the prism beam-combining arrangement is that dichroic coatings and antireflection coatings must be applied in successive coating operations. This is a disadvantage in a manufacturing context rather than in a performance or reliability context. In particular, each operation can be expected to be less than 100% successful, particularly if the wavelength-difference of colors to be combined by the dichroic coatings is close to the resolution limit of the coatings. FIG. 5 schematically illustrates another alternative beam combining arrangement 50M that can mitigate this disadvantage.

Arrangement 50M is similar to pentagonal-prism arrangement 50 with an exception that surfaces 51, 53 and 55 of the pentagonal prism are not dichroic coated, but rather, are uncoated. Arrangement 50M includes substrates 71, 73, and 75, surfaces 71A, 73A, and 75A, respectively, of which have the necessary dichroic-coatings. These surfaces are optically bonded, preferably via an optical contact bond, to surfaces 51, 53, and 55, respectively of the regular pentagonal prism. This provides that the dichroic coatings can be separately deposited and tested to avoid potential yield problems with multiple coatings of the prism. This also provides that a prism can be readily customized for any combination of beam wavelengths from an inventory of dichroic coated substrates with a plurality of different wavelength combination properties.

Those skilled in the art will recognize that while the present invention has been described in a context of combining four different colored beams on a common path, the invention is applicable to combining more or less than four beams. It should be noted however that a regular hexagonal prism cannot be used to combine five different colored beams and square prism can not be used to combine three different colored beams. In these three-beam and five-beam cases either an irregular four or six sided prism, respectively may be used. However, a regular pentagonal prism with only two surfaces dichroic coated may be used to combine three different colored beams and a regular heptagonal prism with only four surfaces thereof dichroic coated may be used to combine five different colored beams.

Generally it can be stated that in a beam-combining arrangement in accordance with the present invention, a regular polygonal prism having N surfaces where N is an integer equal to 3 or more but not 4 or 6, can be used to combine a maximum of N-1 different colored beams on a common path if a number of surfaces one less than the number of beams to be combined is dichroic coated. A practical limit to the number of different colored beams that may be combined may be the resolution or color-separation ability of the dichroic coatings.

In summary, the present invention is described above in terms of a preferred and other embodiments. The invention is not limited, however, to the embodiments described and depicted. Rather, the invention is limited only by the claims appended hereto.

What is claimed is:

1. Optical apparatus, comprising:
   a housing including first and second compartments arranged one above the other;
   the first compartment including a plurality N of lasers, wherein N is 4 or greater, and each laser is arranged to emit one of a corresponding plurality of laser beams each thereof having one of N different wavelengths;
   the first compartment further including N first beam-steering minors arranged to direct a corresponding one of the laser beams into the second compartment; and
   the second compartment including a beam-combining arrangement and N second beam-steering mirrors, each thereof arranged to receive the beam from a corresponding one of the N first beam-steering mirrors and direct that beam to the beam-combining arrangement, the beam combining arrangement being configured to receive the separate beams and combine the beams on a common path and wherein the beam-combining arrangement is a polygonal prism having at least N+1 surfaces, wherein each of the N beams enters the prism via a corresponding one of N of the N+1 surfaces and the beams exit the prism via the other one of the N+1 surfaces.

2. The apparatus of claim 1, wherein N is four and the polygonal prism is a regular pentagonal prism.

3. Optical apparatus, comprising:
   a housing including first and second compartments arranged one above the other;
   the first compartment including a plurality N of lasers, wherein N is 4 or greater, and each laser is arranged to emit one of a corresponding plurality of laser beams each thereof having one of N different wavelengths;
   the first compartment further including N first beam-steering mirrors arranged to direct a corresponding one of the laser beams into the second compartment; and
   the second compartment including a beam-combining arrangement and N second beam-steering mirrors, each thereof arranged to receive the beam from a corresponding one of the N first beam-steering minors and direct that beam to the beam-combining arrangement, the beam combining arrangement being configured to receive the separate beams and combine the beams on a common path wherein the beam-combining arrangement includes N-1 dichroic minors arranged at an angle to each other and each thereof is transparent for one of the N beams and reflective for at least one of the other beams, and wherein each of N-1 of the N beams is transmitted through a corresponding one of the N-1 dichroic mirrors and the N beams are reflected along the common path by one of the three dichroic mirrors.

4. The apparatus of claim 3, wherein N is 4 and there are three dichroic minors and the dichroic mirrors are aligned with sides of an imaginary regular pentagon.

5. The apparatus of claim 1, wherein the housing includes a third compartment and the third compartment includes power supplies for the lasers in the first compartment, and wherein the third compartment is located below the first compartment and above the second compartment.

6. Apparatus for combining N different laser beams having N different wavelengths, the apparatus comprising:
   a solid polygonal prism having at least N+1 surfaces, and wherein each of the N beams enters the prism via a corresponding one of the N+1 surfaces, and wherein after entering the prism, N-1 of the beams are internally reflected off one or more of the surfaces in a manner to combine the beams along a common path and wherein all of the beams exit the prism via one of the remaining surfaces as a combined beam and wherein at least two of the surfaces include a dichroic interface, each of said dichroic interfaces acting as a transmissive surface for one of the laser wavelengths and a reflecting surface for another one of the laser wavelengths.

7. The apparatus of claim 6, wherein N is 4 or greater.

8. The apparatus of claim 7, wherein the polygonal prism is a regular polygonal prism.

9. The apparatus of claim 7, wherein N is four and the prism is a regular pentagonal prism.

10. A laser system comprising:
    four lasers, each laser generating a laser beam having a different wavelength; and
    a beam combiner positioned to receive each of the beams and combine the beams along a common path, said beam combiner being in the form of a pentagonal prism have five faces, wherein four of the faces of the prism function as input faces for one of the four laser beams and the fifth face functions as an output face.

11. A system as recited in claim 10, wherein three of the input faces are provided with an optical coating which is reflective for at least one of the other wavelengths which is not entering the prism at that face.

12. A system as recited in claim 10, wherein three of the input faces are provided with substrates, said substrates including an optical coating which is reflective for at least one of the other wavelengths which is not entering the prism at that face.

13. Optical apparatus, comprising:

a housing including first, second, and third compartments;

the first compartment including a plurality N of lasers, each thereof arranged to emit one of a corresponding plurality of laser beams each thereof having one of N different wavelengths;

the first compartment further including N first beam-steering mirrors arranged to direct a corresponding one of the laser beams into the second compartment;

the second compartment including a beam-combining arrangement and N second beam-steering mirrors, each thereof arranged to receive the beam from a corresponding one of the N first beam-steering mirrors and direct that beam to the beam-combining arrangement, the beam combining arrangement being configured to receive the separate beams and combine the beams on a common path; and the third compartment including power supplies for the lasers in the first compartment, and wherein the third compartment is located below the first compartment and above the second compartment.

14. Apparatus for combining N different laser beams having N different wavelengths, the apparatus comprising:

a polygonal prism having at least N+1 surfaces, wherein N is 4 or greater, and wherein each of the N beams enters the prism via a corresponding one of the N+1 surfaces and all of the beams exit the prism via one of the remaining surfaces as a combined beam and wherein at least two of the surfaces include a dichroic interface, each of said dichroic interfaces acting as a transmissive surface for one of the laser wavelengths and a reflecting surface for another one of the laser wavelengths.

15. The apparatus of claim 14, wherein the polygonal prism is a regular polygonal prism.

16. The apparatus of claim 14, wherein N is four and the prism is a regular pentagonal prism.

17. Apparatus for combining N different laser beams having N different wavelengths, the apparatus comprising:

a solid polygonal prism having at least N+1 surfaces, wherein N is greater than 4, and wherein each of the N beams enters the prism via a corresponding one of the N+1 surfaces, and wherein after entering the prism, N−1 of the beams are internally reflected off one or more of the surfaces in a manner to combine the beams along a common path and wherein all of the beams exit the prism via one of the remaining surfaces as a combined beam.

18. Apparatus for combining N different laser beams having N different wavelengths, the apparatus comprising:

a regular pentagonal prism having at least N+1 surfaces, wherein N is 4 or greater, and wherein each of the N beams enters the prism via a corresponding one of the N+1 surfaces and all of the beams exit the prism via one of the remaining surfaces as a combined beam.

\* \* \* \* \*